(12) United States Patent
Hong et al.

(10) Patent No.: US 7,656,347 B2
(45) Date of Patent: Feb. 2, 2010

(54) QUADRATURE RADAR APPARATUS

(75) Inventors: Song-Cheol Hong, Daejeon (KR); Choul-Young Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 12/343,583

(22) Filed: Dec. 24, 2008

(65) Prior Publication Data

US 2009/0207072 A1    Aug. 20, 2009

(30) Foreign Application Priority Data

Feb. 18, 2008    (KR) .................... 10-2008-0014420

(51) Int. Cl.
   *G01S 7/35*    (2006.01)
   *G01S 7/02*    (2006.01)
   *G01S 13/00*   (2006.01)

(52) U.S. Cl. ............................ 342/194; 342/21; 342/70; 342/82; 342/89; 342/175; 342/192; 342/193

(58) Field of Classification Search .................. 342/21, 342/70–72, 82–103, 118, 128–133, 175, 342/188–197, 200–205, 27, 28, 361–366; 701/300, 301; 375/130–153; 324/76.52, 324/76.53; 327/113, 114, 116–123; 331/46, 331/56, 74–77, 96, 99–102, 107 R, 108 R, 331/114, 115, 107 DP, 107 P, 107 SL, 107 C, 331/132

See application file for complete search history.

(56) References Cited

U.S. PATENT DOCUMENTS

| | | | | | |
|---|---|---|---|---|---|
| 3,603,992 | A | * | 9/1971 | Goggins et al. | ............. 342/193 |
| 3,614,786 | A | * | 10/1971 | Goggins, Jr. | ................ 342/193 |
| 3,649,909 | A | * | 3/1972 | Ort et al. | ................. 324/76.53 |
| 3,703,004 | A | * | 11/1972 | Slater | ......................... 342/194 |
| 3,719,946 | A | * | 3/1973 | Sletten et al. | ............... 342/193 |
| 4,217,585 | A | * | 8/1980 | Fishbein et al. | ............. 342/189 |
| 4,499,467 | A | * | 2/1985 | Rittenbach | .................. 342/194 |

(Continued)

FOREIGN PATENT DOCUMENTS

KR    10-2006-0005593    1/2006

(Continued)

OTHER PUBLICATIONS

Choul-Young Kim, et al. "A Quadrature Radar Topology With Tx Leakage Canceller, for 24-GHz Radar Applications", IEEE Transactions on Microwave Theory and Techniques, vol. 55, No. 7, Jul. 2007.

*Primary Examiner*—Bernarr E Gregory
(74) *Attorney, Agent, or Firm*—Edwards Angell Palmer & Dodge LLP; Peter C. Lauro, Esq.

(57) ABSTRACT

A quadrature radar apparatus includes a quadrature signal generating unit, a plurality of coupler modules connected to the signal generating unit, an antenna unit receiving transmission signals from the coupler modules and a reception signal reflected from a target, one or more phase delay modules connected between one or more of the coupler modules and the antenna unit to delay the phases of the transmission and reception signals by 90 degrees, a leakage signal canceling unit combining the reception signals inputted from the antenna unit through the first and second coupler modules and removes the transmission leakage signal.

17 Claims, 4 Drawing Sheets

U.S. PATENT DOCUMENTS

| | | | |
|---|---|---|---|
| 4,967,160 A * | 10/1990 | Quievy et al. | 327/116 |
| 4,970,519 A * | 11/1990 | Minnis et al. | 342/194 |
| 5,059,927 A * | 10/1991 | Cohen | 331/77 |
| 5,146,616 A * | 9/1992 | Tang et al. | 342/201 |
| 5,861,837 A * | 1/1999 | Richardson et al. | 342/93 |
| 5,969,667 A * | 10/1999 | Farmer et al. | 342/70 |
| 7,071,869 B2 * | 7/2006 | Song et al. | 342/194 |
| 7,081,850 B2 * | 7/2006 | Small | 342/194 |
| 7,176,828 B2 * | 2/2007 | Tirkel et al. | 342/194 |
| 2006/0087473 A1 * | 4/2006 | Song et al. | 342/194 |

FOREIGN PATENT DOCUMENTS

KR  10-0748992  8/2007

* cited by examiner

QUADRATURE RADAR APPARATUS

CROSS-REFERENCE TO RELATED APPLICATION

This application claims under 35 U.S.C. §119(a) the benefit of Korean Patent Application No. 10-2008-0014420 filed Feb. 18, 2008, the entire contents of which are incorporated herein by reference.

BACKGROUND

1. Technical Field

The present disclosure relates to a quadrature radar apparatus, and more particularly, to a quadrature radar apparatus having a transmission leakage signal canceller, which can reduce a polarization loss and an interference between radars.

2. Related Art

Researches relating to a radar apparatus have been made, as disclosed in, e.g., Korean Patent No. 0748992 entitled "circular polarization radar apparatus."

As described in FIG. 1, this disclosure relates to a circular polarization radar apparatus of obtaining a base band signal by removing a transmission leakage signal without a loss of transmission power. The apparatus includes: a signal generator 11 generating two signals having 180 degrees of the phase difference; first and second coupler modules 12 and 13 each receiving each of the two signals generated from the signal generator; a circular polarization type antenna 14 receiving signals from the first and second coupler modules; a 90 degree phase delay module 15 connected between the second coupler module and an input of the antenna; a power combining unit 16 combining a reception signal inputted from the antenna and removing reception signals leaked from the first and second coupler modules; and a mixer 17 mixing the signals from the first and second coupler modules and the signal from the power combining unit.

According to the related art technology as described above, however, there is a limitation in that a loss of 3 db signal on a signal generator may occur upon reception.

The above information disclosed in this Background section is only for enhancement of understanding of the background of the invention and therefore it may contain information that does not form the prior art that is already known in this country to a person of ordinary skill in the art.

SUMMARY

Embodiments of the present invention are directed to provide a quadrature radar apparatus that can prevent a reception power loss.

Embodiments of the present invention are also directed to provide a quadrature radar apparatus that can prevent a polarization loss and an interference between radars.

According to an aspect of the present invention, there is provided a quadrature radar apparatus including: a quadrature signal generating unit generating four signals having 0 degree, −90 degrees, −180 degrees, and −270 degrees, respectively; first and second coupler modules each receiving one of the signals from the quadrature signal generating unit and outputting a transmission signal and a transmission leakage signal; an antenna unit receiving the transmission signals from the first and second coupler modules and a reception signal reflected from a target; a first phase delay module connected between the first coupler module and the antenna unit and delaying the phases of the transmission and reception signals by 90 degrees; a leakage signal canceling unit combining the reception signals inputted from the antenna unit through the first and second coupler modules and removing the transmission leakage signal; a power distribution unit distributing an output signal of the leakage signal canceling unit; and first and second mixing units mixing the signal of the quadrature signal generating unit and the output signal of the power distribution unit.

According to another aspect of the present invention, there is provided a quadrature radar apparatus comprising: a quadrature signal generating unit generating four signals having 0 degree, −90 degrees, −180 degrees, and −270 degrees, respectively; first and second coupler modules each receiving one of the signals from the quadrature signal generating unit and outputting a transmission signal and a transmission leakage signal; an antenna unit receiving the transmission signals from the first and second coupler modules and a reception signal reflected from a target; first and second phase delay modules connected between the first coupler module and the antenna unit and delaying the phases of the transmission and reception signals by 90 degrees; a leakage signal canceling unit combining the reception signals inputted from the antenna unit through the first and second coupler modules and removing the transmission leakage signal; a power distribution unit distributing an output signal of the leakage signal canceling unit; and first and second mixing units mixing the signal of the quadrature signal generating unit and the output signal of the power distribution unit.

BREIF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Features and advantages of the present invention will be more clearly understood by the following detailed description of the preferred embodiments by reference to the accompanying drawings. It is first noted that terms or words used herein should be construed as meanings or concepts corresponding with the technical sprit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

Hereinafter, specific embodiments of the present invention will be described in detail with reference to the accompanying drawings.

A quadrature radar apparatus according to a first embodiment of the present invention will be described with reference to FIGS. 2 and 3 as follows.

Figure 1:
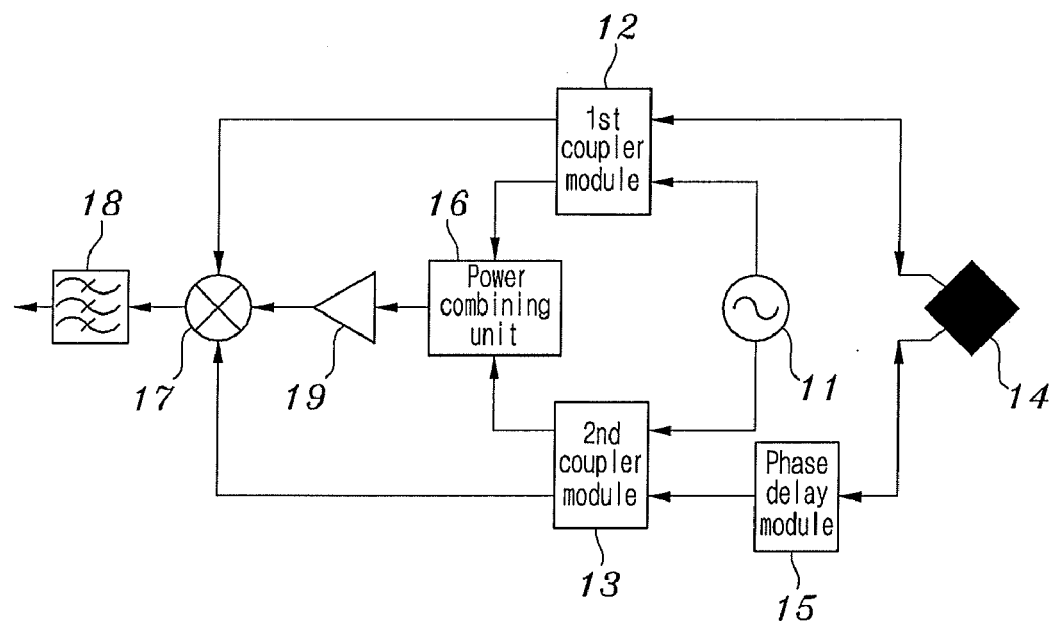
FIG. 1 is a diagram illustrating a conventional circular polarization radar apparatus.
Figure 2:
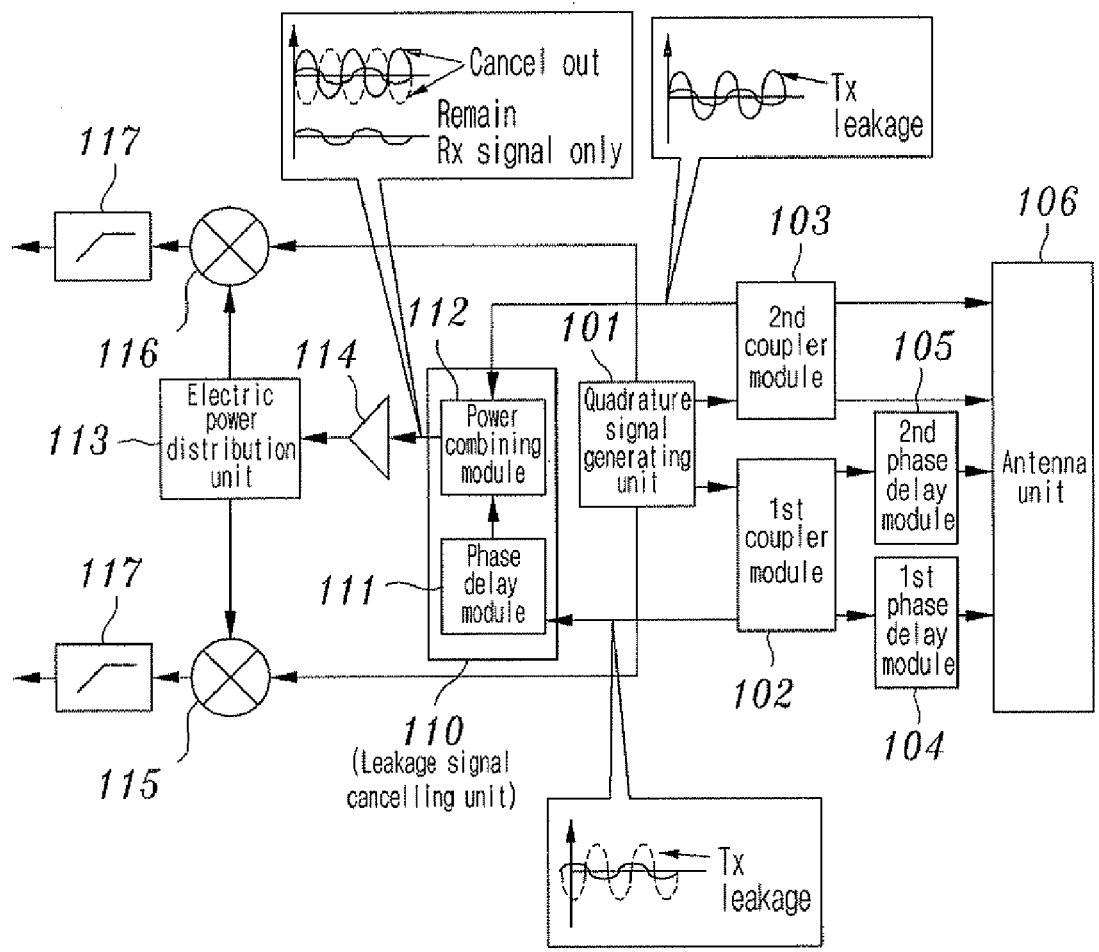
FIG. 2 is a schematic block diagram illustrating a quadrature radar apparatus according to a first embodiment of the present invention.

Referring to FIG. 2, the quadrature radar apparatus according to the first embodiment of the present invention includes a quadrature signal generating unit 101, a first coupler module 102, a second coupler module 103, a first phase delay module 104, a second phase delay module 105, an antenna unit 106, a leakage signal canceling unit 110, an electric power distribution unit 113, a low noise amplification unit 114, a first mixing unit 115, a second mixing unit 116, and a filter unit 117.

The quadrature signal generating unit 101 generates four signals having a phase difference (0, −90, −180 and −270 degrees) of 90 degrees therebetween.

Also, the first coupler module 102 is connected to the quadrature signal generating unit 101 to receive a signal therefrom, and generates two transmission signals and an undesired transmission leakage signal. Here, the two transmission signals having a phase difference of 90 degrees therebetween are outputted to the first and second phase delay modules 104 and 105, respectively. The transmission leakage signal is outputted to the leakage signal canceling unit 110.

Similarly, the second coupler module 103 is connected to the quadrature signal generating unit 101 to receive a signal therefrom, and generates two transmission signals and an undesired transmission leakage signal. Here, the two transmission signals having a phase difference of 90 degrees therebetween are outputted to the antenna unit 106. The transmission leakage signal is outputted to the leakage signal canceling unit 110.

Each of the first and second coupler modules 102 and 103 according to the embodiment receives a signal from the quadrature signal generating unit 101. In this case, the phase difference between the two signals is 90 degrees.

Here, the first and second coupler modules 102 and 103 according to the embodiment may, suitably, be set up with a Lange coupler, but they are not limited thereto. That is, it will be appreciated that the first and second coupler modules 102 and 103 may be set up with, for example, a directional coupler or a branch line coupler. Each of the first and second coupler modules 102 and 103 according to the embodiment receives a signal from the quadrature signal generating unit 101 to generate an undesired transmission leakage signal, and receives a reception signal from the antenna unit 106 to transmit the reception signal together with the transmission leakage signal to the leakage signal canceling unit 110.

The first phase delay module 104 is connected between the first coupler module 102 and the antenna unit 106 and delays the phases of a transmission signal of the first coupler module 102 and a reception signal from the antenna unit 106 by 90 degrees.

Similarly, the second phase delay module 105 is connected between the first coupler module 102 and the antenna unit 106 and delays the phases of a transmission signal of the first coupler module 102 and a reception signal from the antenna unit 106 by 90 degrees.

The antenna unit 106 receives two signals having a phase difference of 90 degrees from the second coupler module 103, and operates by receiving two signals having the phase difference of 90 degrees through the first and second phase delay modules 104 and 105. In this case, when the phase of one signal is 0 degree, phases of the other signals entering and leaving the antenna input unit are −90 degrees, −180 degrees, −270 degrees.

The leakage signal canceling unit 110 includes a phase delay module 111 and a power combining module 112. The leakage signal canceling unit 110 combines signals from the first coupler module 102 and the second coupler module 103, and performs a function of removing a transmission leakage signal generated upon transmission of the signals.

Although, the leakage signal canceling unit 110 according to the embodiment may suitably be set up with the phase delay module 111 and the power combining module 112, it is not limited thereto. That is, the leakage signal canceling unit 110 may be set up with, e.g., a quadrature coupler, which is a 4-port type coupler such as the Lange coupler or the branch line coupler. In this case, the coupler separates the transmission leakage signal and the reception signal. Accordingly, the transmission leakage signals leaked from the first and second coupler modules 102 and 103 are together outputted to one output port, and the reception signals received from the first and second coupler modules 102 and 103 are together outputted to the other output port. In this case, the leakage signal canceling unit 110 according to the embodiment may allow the transmission leakage signal to be consumed through a resistance by connecting a terminating resistance of, e.g., 50 ohm to the output port where the transmission leakage signals are together outputted. The output port where the reception signals are together outputted is used as an output port of the leakage signal canceling unit 110.

The phase delay module 111 delays the phase of the reception signal received from the antenna unit 106 through the first coupler module 102 after being reflected from a target and the phase of the transmission leakage signal generated at the first coupler module 102 by 90 degrees upon transmission.

The power combining module 112 is connected to the phase delay module 111 and the second coupler module 103, combines the reception signals from the phase delay module 111 and the second coupler module 103, and removes the transmission leakage signal generated upon transmission.

The power combining module 112 according to the embodiment may preferably be set up with a Wilkinson power combiner, but it is not limited thereto. That is, for example, a 3-port combiner such as a T-junction combiner may be applied.

The electric power distribution unit 113 distributes an output signal from the leakage signal canceling unit 110.

The low noise amplification unit 114 is connected between the leakage signal canceling unit 110 and the electric power distribution unit 113 to amplify the output signal from the leakage signal canceling unit 110.

The first mixing unit 115 is connected to the quadrature signal generating unit 101 and the electric power distribution unit 113 to mix the signal generated at the quadrature signal generating unit 101 and the output signal from the electric power distribution unit 113.

Similarly, the second mixing unit 116 is connected to the quadrature signal generating unit 101 and the electric power distribution unit 113 to mix the signal generated at the quadrature signal generating unit 101 and the output signal from the electric power distribution unit 113. Here, the phase difference between the signals transmitted from the quadrature signal generating unit 101 to the first mixing unit 115 and the second mixing unit 116 is 90 degrees.

The filter unit 117 filters the output signal of the first mixing unit 115 and the output signal of the second mixing unit 116 into a base band signal and outputs the base band signal.

As discussed above, the quadrature signal generating unit 101 according to the embodiment generates four signals having phases of 0 degree, −90 degrees, −180 degrees, and −270 degrees, which are inputted into the first and second coupler modules 102 and 103 and the first and second mixing units 115 and 116. In this case, two signals inputted into the first and second coupler modules 102 and 103 have the phase difference of 90 degrees. Also, signals inputted into the first and second mixing units 115 and 116 have the phase difference of 90 degrees.

Figure 3:
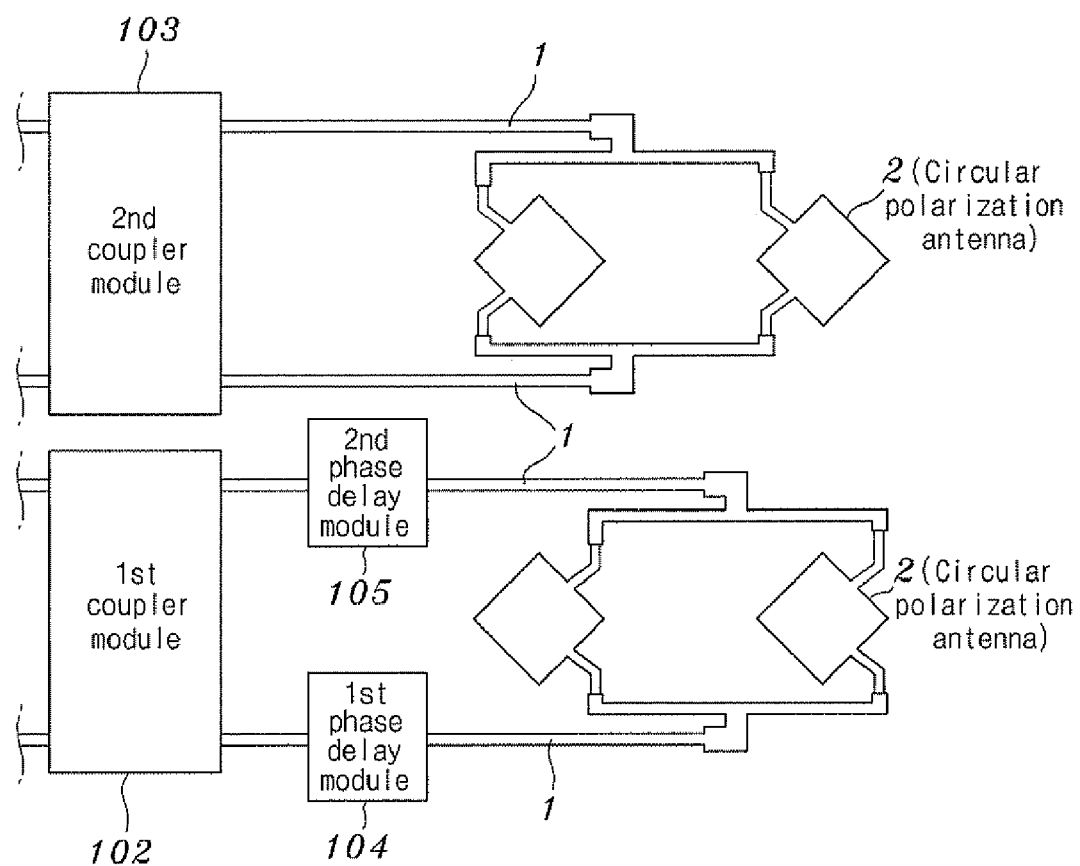
FIG. 3 is a diagram illustrating a feed line and an antenna unit of the quadrature radar apparatus according to the first embodiment of the present invention.

In this embodiment, as shown in FIG. 3, the antenna unit 106 may be set up with a circular polarization antenna 3. The antenna unit 106 is connected to the second coupler module 103 through two feed lines and connected to each of the first and second phase delay modules 104 and 105 through a respective feed line. That is, the signals outputted from the first coupler module 102 and the second coupler module 103 are transmitted to the antenna unit 106 through four feed lines 1.

In the quadrature radar apparatus according to the embodiment, the signal propagated from the antenna unit 106 is returned to the antenna unit 106 after being reflected by the target (not shown). When the signals are received, the signal entering and leaving the first and second phase delay modules 104 and 105, i.e., the signal transmitted through the first coupler module 102 is delayed by 180 degrees compared to the signal transmitted through the second coupler module 103.

Finally, the signal reflected from the target is combined into the same phase at the power combining module 112 of the leakage signal canceling unit 110. That is, the transmission signal is diminished to a certain extent by the coupler isolation property of the first and second coupler modules 102 and 103. However, transmission signal is much leaked because the isolation degree is low. In this case, two transmission signals leaked from the first and second coupler modules 102 and 103 have the phase difference of 90 degrees. The leakage signal leaked from the first coupler module 102 is delayed by 90 degrees by the phase delay module 111 of the leakage signal canceling unit 110. In this case, because the size of the signals is identical to each other and the phase difference between the signals is 180 degrees, the leakage signals are mutually cancelled out at the power combining module 112 of the leakage signal canceling unit 110. Accordingly, only the signal reflected from the target remains.

The low noise amplification unit 114 according to the embodiment amplifies the output signal of the leakage signal canceling unit 110. The electric power distribution unit 113 distributes the output signal of the leakage signal canceling unit 110 amplified by the low noise amplification unit 114 into the first and second mixing units 115 and 116.

The first mixing unit 115 according to the embodiment receives and mixes the output signal of the leakage signal canceling unit 110 distributed through the electric power distribution unit 113 and the signal from the quadrature signal generating unit 101.

Likewise, the second mixing unit 116 receives and mixes the output signal of the leakage signal canceling unit 110 distributed through the electric power distribution unit 113 and the signal from the quadrature signal generating unit 101. Here, the phase difference between the signals transmitted from the quadrature signal generating unit 101 to the first mixing unit 115 and the second mixing unit 116 is 90 degrees.

The filter unit 117 filters the output signal of the first mixing unit 115 and the output signal of the second mixing unit 116 into a base band signal and outputs the base band signal.

With the above-described quadrature radar apparatuses, a reception electric power loss and a polarization loss can be eliminated or reduced.

A quadrature radar apparatus according to a second embodiment of the present invention will be described in detail with reference to FIG. 4.

Figure 4:
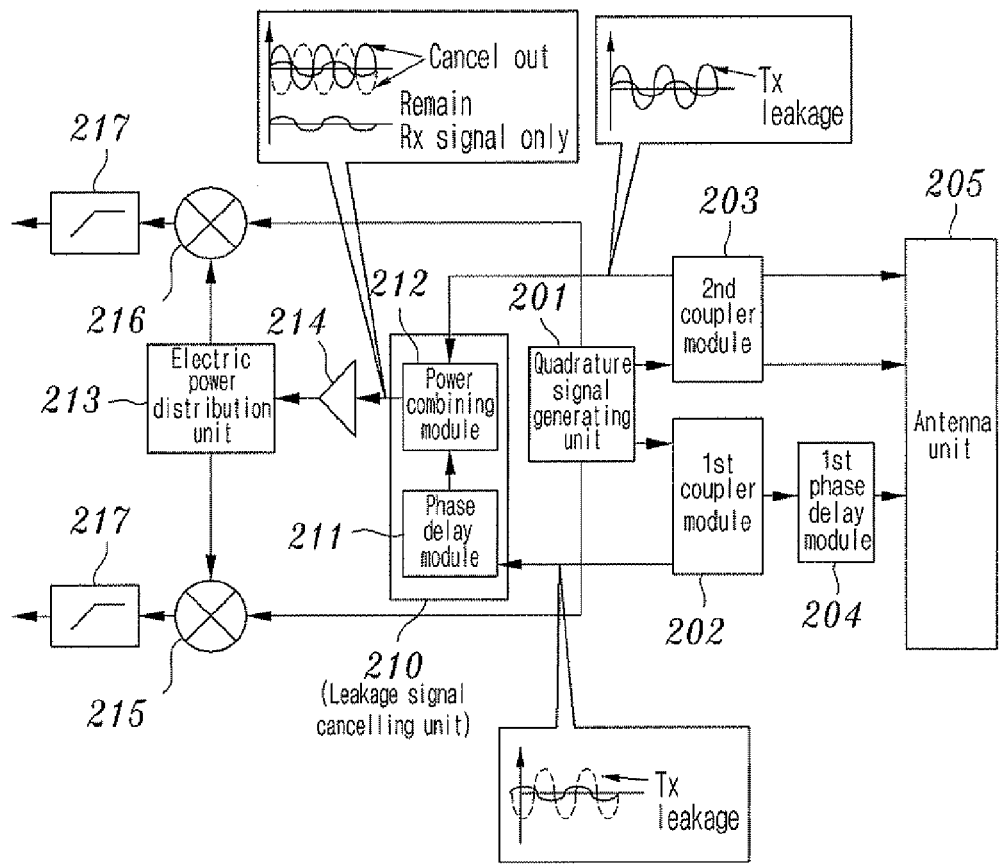
FIG. 4 is a schematic block diagram illustrating a quadrature radar apparatus according to a second embodiment of the present invention.

Referring to FIG. 4, the quadrature radar apparatus according to the second embodiment of the present invention includes a quadrature signal generating unit 201, a first coupler module 202, a second coupler module 203, a first phase delay module 204, an antenna unit 205, a leakage signal canceling unit 210, an electric power distribution unit 213, a low noise amplification unit 214, a first mixing unit 215, a second mixing unit 216, and a filter unit 217.

The quadrature signal generating unit 201 generates four signals (0, −90, −180 and −270 degrees) having a phase difference of 90 degrees therebetween.

The first coupler module 202 is connected to the quadrature signal generating unit 201 to receive a signal therefrom, and generates a transmission signal and an undesired transmission leakage signal. Here, the transmission signal is outputted to the first phase delay module 204. The transmission leakage signal is outputted to the leakage signal canceling unit 210.

The second coupler module 203 is connected to the quadrature signal generating unit 201 to receive a signal having a phase difference of 90 degrees with regard to the signal transmitted to the first coupler module 202, and generates a transmission signal and an undesired transmission leakage signal. Here, the transmission signal is outputted to the antenna unit 205 and the transmission leakage signal is outputted to the leakage signal canceling unit 210.

Preferably, the first and second coupler modules 202 and 203 according to the embodiment may include a 3-port type coupler such as a circulator.

Each of the first and second coupler modules 202 and 203 according to the embodiment receives a signal from the quadrature signal generating unit 201 to generate an undesired transmission leakage signal, and receives a reception signal from the antenna unit 205 to transmit the reception signal together with the transmission leakage signal to the leakage signal canceling unit 110.

The first phase delay module 204 is connected to the first coupler module 202 and delays the phase of the signal of the first coupler module 202 by 90 degrees.

The antenna unit 205 is connected to the first coupler module 202 via the first phase delay module 204 through one feed line. Also, the antenna unit 205 receives a signal from the second coupler module 203 through one feed line to operate. That is, in this embodiment, the antenna unit 205 is a linear polarization antenna including two feed lines.

The leakage signal canceling unit 210 includes a phase delay module 211 and a power combining module 212 to combine signals received from the first coupler module 202 and the second coupler module 203 and to remove a transmission leakage signal generated upon transmission, as described below.

Although the leakage signal canceling unit 210 according to the embodiment may be set up with the phase delay module 211 and the power combining module 212, it is not limited thereto. That is, for instance, the leakage signal canceling unit 210 may be set up with a quadrature coupler, which is a 4-port type coupler such as the Lange coupler or the branch line coupler. In this case, the coupler separates the transmission leakage signal and the reception signal. Accordingly, the transmission leakage signals leaked from the first and second coupler modules 202 and 203 are together outputted to one output port, and the reception signals received from the first and second coupler modules 202 and 203 are together outputted to the other output port. In this case, the leakage signal canceling unit 210 according to the embodiment may allow the transmission leakage signal to be consumed through a resistance by connecting a terminating resistance of, e.g., 50 ohm to the output port where the transmission leakage signals are together outputted. The output port where the reception signals are together outputted is used as an output port of the leakage signal canceling unit 210.

The phase delay module 211 delays the phase of the reception signal, which is received from the antenna unit 205 through the first coupler module 202 after being reflected from a target (not shown), and the phase of the transmission leakage signal, which is generated at the first coupler module 202, by 90 degrees upon transmission.

The power combining module 212 is connected to the phase delay module 211 and the second coupler module 203, combines the reception signals from the phase delay module 211 and the second coupler module 203, and removes the transmission leakage signal generated upon transmission.

The power combining module 212 may be set up with a Wilkinson power combiner, but not limited thereto. For instance, a 3-port combiner such as a T-junction combiner may be applied.

The electric power distribution unit 213 distributes an output signal from the leakage signal canceling unit 210.

The low noise amplification unit 214 is connected between the leakage signal canceling unit 210 and the electric power distribution unit 213 to amplify the output signal from the leakage signal canceling unit 210.

The first mixing unit 215 is connected to the quadrature signal generating unit 201 and the electric power distribution unit 213 to mix the signal generated at the quadrature signal generating unit 201 and the output signal from the electric power distribution unit 213.

Similarly, the second mixing unit 216 is connected to the quadrature signal generating unit 201 and the electric power distribution unit 213 to mix the signal generated at the quadrature signal generating unit 201 and the output signal from the electric power distribution unit 213. Here, the phase difference between the signals transmitted from the quadrature signal generating unit 201 to the first mixing unit 215 and the second mixing unit 216 is 90 degrees.

The filter unit 217 filters the output signal of the first mixing unit 215 and the output signal of the second mixing unit 216 into a base band signal and outputs the base band signal.

As described above, the quadrature signal generating unit 201 according to the embodiment generates four signals having phases of 0 degree, −90 degrees, −180 degrees, and −270 degrees, which are inputted into the first and second coupler modules 202 and 203 and the first and second mixing units 215 and 216. In this case, two signals inputted into the first and second coupler modules 202 and 203 have the phase difference of 90 degrees. Also, signals inputted into the first and second mixing units 215 and 216 have the phase difference of 90 degrees.

The antenna unit 205 according to the embodiment is set up with a linear polarization antenna. The antenna unit 205 is connected to the second coupler module 203 through one feed line, and connected to the first phase delay modules 204 through one feed line. That is, the signals outputted from the first coupler module 202 and the second coupler module 203 are transmitted to the antenna unit 205 through two feed lines.

In the quadrature radar apparatus according to the embodiment, the signal propagated through the antenna unit 205 is returned to the antenna unit 205 after being reflected by the target (not shown). When the signals are received, the signal entering and leaving the first phase delay modules 204, i.e., the signal transmitted through the first coupler module 202 is delayed by 180 degrees compared to the signal transmitted through the second coupler module 203.

Finally, the signal reflected from the target is combined into the same phase at the power combining module 212 of the leakage signal canceling unit 210. In this case, the transmission signals leaked from the first and second coupler modules 202 and 203 have the phase difference of 90 degrees. The leakage signal leaked from the first coupler module 202 is delayed by 90 degrees by the phase delay module 211 of the leakage signal canceling unit 210. In this case, because the size of the signals is identical to each other and the phase difference between the signals is 180 degrees, the leakage signals are mutually cancelled out at the power combining module 212 of the leakage signal canceling unit 210. Accordingly, only the signal reflected from the target remains.

The low noise amplification unit 214 according to the embodiment amplifies the output signal of the leakage signal canceling unit 210. The electric power distribution unit 213 distributes the output signal of the leakage signal canceling unit 210 amplified by the low noise amplification unit 214 into the first and second mixing units 215 and 216.

The first mixing unit 215 according to the embodiment receives and mixes the output signal of the leakage signal canceling unit 210 distributed through the electric power distribution unit 213 and the signal from the quadrature signal generating unit 201.

Similarly, the second mixing unit 216 receives and mixes the output signal of the leakage signal canceling unit 210 distributed through the electric power distribution unit 213 and the signal from the quadrature signal generating unit 201. Here, the phase difference between the signals transmitted from the quadrature signal generating unit 201 to the first mixing unit 215 and the second mixing unit 216 is 90 degrees.

The antenna unit 205 according to the second embodiment is simpler in structure than that of the first embodiment.

The above-described quadrature radar apparatuses according to the embodiments of the present invention provide advantages including the following. The leakage signal of a transmitter can be reduced, thereby enhancing the receive sensitivity of the radar. Also, a receiver can be prevented from being saturated with the leakage signal of a transmitting end. Further, an increase of the noise factor due to the leakage electric power of the receiving end can also be prevented. In addition, a polarization loss can be prevented. An interference and resulting problems that can occur when two identical radar systems face each other can be prevented. Moreover, directional component and displacement with respect to the motion of an object can be detected. Furthermore, it is possible to decrease the size of the radar apparatus because the antenna can be shared.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A quadrature radar apparatus comprising:
   a quadrature signal generating unit generating four signals having 0 degree, −90 degrees, −180 degrees, and −270 degrees, respectively;
   first and second coupler modules each receiving one of the signals from the quadrature signal generating unit and outputting a transmission signal and a transmission leakage signal;
   an antenna unit receiving the transmission signals from the first and second coupler modules and a reception signal reflected from a target;

a first phase delay module connected between the first coupler module and the antenna unit to delay the phases of the transmission and reception signals by 90 degrees;

a leakage signal canceling unit combining the reception signals inputted from the antenna unit through the first and second coupler modules and removing the transmission leakage signal;

a power distribution unit distributing an output signal of the leakage signal canceling unit; and first and second mixing units mixing the signal of the quadrature signal generating unit and the output signal of the power distribution unit.

2. The quadrature radar apparatus of claim 1, further comprising a low noise amplification unit connected between the leakage signal canceling unit and the power distribution unit to amplify the output signal of the leakage signal canceling unit.

3. The quadrature radar apparatus of claim 1, further comprising a filter unit filtering the signals mixed by the first and second mixing units and outputting the signals as a base band signal.

4. The quadrature radar apparatus of claim 1, wherein the antenna unit is a linear polarization antenna connected to the second coupler module and the first phase delay module through one feed line, respectively.

5. The quadrature radar apparatus of claim 1, wherein the leakage signal canceling unit comprises:
a power combining module combining the reception signals inputted from the antenna unit through the first and second coupler modules and removing the transmission leakage signal; and
a phase delay module connected between the first coupler module and the power combining module and delaying the phase of a signal or signals by 90 degrees.

6. The quadrature radar apparatus of claim 1, wherein the leakage signal canceling unit comprises one of a Lange coupler and a branch line coupler, and separates the transmission leakage signal and the reception signal inputted from the first and second coupler modules, the transmission leakage signal being consumed by a terminating resistance connected to an output port for an transmission leakage signal, the reception signal being outputted from an output port for the reception signal which is connected to the power distribution unit.

7. The quadrature radar apparatus of claim 1, wherein each of the first and second coupler modules comprises a 3-port type coupler, the signals inputted from the quadrature signal generating unit having a phase difference of 90 degrees from each other.

8. The quadrature radar apparatus of claim 1, wherein the signals mixed by the first and second mixing units have a phase difference of 90 degrees from each other.

9. A quadrature radar apparatus comprising:
a quadrature signal generating unit generating four signals having 0 degree, −90 degrees, −180 degrees, and −270 degrees, respectively;
first and second coupler modules each receiving one of the signals from the quadrature signal generating unit and outputting a transmission signal and a transmission leakage signal;
an antenna unit receiving the transmission signals from the first and second coupler modules and a reception signal reflected from a target;
first and second phase delay modules each connected between the first coupler module and the antenna unit to delay the phases of the transmission and reception signals by 90 degrees;
a leakage signal canceling unit combining the reception signals inputted from the antenna unit through the first and second coupler modules and removing the transmission leakage signal;
a power distribution unit distributing an output signal of the leakage signal canceling unit; and
first and second mixing units mixing the signal of the quadrature signal generating unit and the output signal of the power distribution unit.

10. The quadrature radar apparatus of claim 9, further comprising a low noise amplification unit connected between the leakage signal canceling unit and the power distribution unit to amplify the output signal of the leakage signal canceling unit.

11. The quadrature radar apparatus of claim 9, further comprising a filter unit filtering the signals mixed by the first and second mixing units and outputting the signals as a base band signal.

12. The quadrature radar apparatus of claim 9, wherein the antenna unit is a circular polarization antenna connected to the second coupler module through two feed lines and connected to the first and second phase delay modules through one feed line, respectively.

13. The quadrature radar apparatus of claim 9, wherein the leakage signal canceling unit comprises:
a power combining module combining the reception signals inputted from the antenna unit through the first and second coupler modules and removing the transmission leakage signal; and
a phase delay module connected between the first coupler module and the power combining module to delay the phase of a signal or signals by 90 degrees.

14. The quadrature radar apparatus of claim 9, wherein the leakage signal canceling unit comprises one of a Lange coupler and a branch line coupler, and separates the transmission leakage signal and the reception signal inputted from the first and second coupler modules, the transmission leakage signal consumed by a terminating resistance connected to an output port for an transmission leakage signal, the reception signal being outputted from an output port for the reception signal which is connected to the power distribution unit.

15. The quadrature radar apparatus of claim 9, wherein each of the first and second coupler modules comprises one of a directional coupler, a Lange coupler, and a branch line coupler, the signals inputted from the quadrature signal generating unit having a phase difference of 90 degrees from each other.

16. The quadrature radar apparatus of claim 9, wherein, in the second phase delay module, the signal inputted from the first coupler module has a phase difference of 90 degrees from the signal inputted into the first phase delay module.

17. The quadrature radar apparatus of claim 9, wherein the signals mixed by the first and second mixing units have a phase difference of 90 degrees from each other.

* * * * *